United States Patent
Jung et al.

(10) Patent No.: US 6,946,516 B2
(45) Date of Patent: Sep. 20, 2005

(54) RUBBER-MODIFIED STYRENE RESIN COMPOSITION

(75) Inventors: Dae-San Jung, Seoul (KR); Yong-Yeon Hwang, Daejeon (KR); Su-Yeon Na, Incheon (KR); Jong-Kuk Choi, Gwangju (KR); Chan-Hong Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/494,215

(22) PCT Filed: Jul. 7, 2003

(86) PCT No.: PCT/KR03/01348

§ 371 (c)(1),
(2), (4) Date: Apr. 29, 2004

(87) PCT Pub. No.: WO2004/015008

PCT Pub. Date: Feb. 19, 2004

(65) Prior Publication Data

US 2005/0020737 A1 Jan. 27, 2005

(30) Foreign Application Priority Data

Aug. 13, 2002 (KR) ................................ 10-2002-0047817

(51) Int. Cl.$^7$ ................................................. C08K 5/15
(52) U.S. Cl. ........................ 524/751; 524/792; 524/796; 524/773; 524/847; 524/855; 524/856; 524/849
(58) Field of Search ................................ 524/751, 792, 524/796, 773, 847, 855, 856, 849

(56) References Cited

U.S. PATENT DOCUMENTS 4,963,606 A 10/1990 Schleifstein ................ 524/180

FOREIGN PATENT DOCUMENTS

| JP | 7-113033 | 5/1995 |
|---|---|---|
| KR | 1998-044225 | 9/1998 |
| WO | WO 01/29124 A1 * | 4/2001 |

OTHER PUBLICATIONS

PCT International Search Report; International application No. PCT/KR03/01348; International filing date: Jul. 7, 2003; Date of Mailing: Sep. 12, 2003.

* cited by examiner

*Primary Examiner*—William K. Cheung
(74) *Attorney, Agent, or Firm*—Cantor Colburn LLP

(57) ABSTRACT

A rubber-modified flame resistant styrene resin composition, which has superior heat stability and weather resistance to prevent discoloration and deterioration due to heat or light and is processed under various molding condition, is provided. The rubber-modified flame resistant styrene resin composition includes a rubber-modified styrene resin, flame retardant comprising compounds selected from a group consisting of tetrabromobisphenol-A-bis(2,3-dibromopropylether), hexabromocyclododecane and a mixture thereof, and brominated epoxy oligomer, and calcium stearate as a lubricant.

13 Claims, No Drawings

RUBBER-MODIFIED STYRENE RESIN COMPOSITION

BACKGROUND OF THE INVENTION (a) Field of the Invention

The present invention relates to a styrene resin composition having superior heat stability and weather resistance, more particularly to a rubber-modified flame resistant styrene resin composition that has superior heat stability and weather resistance to prevent discoloration or deterioration due to heat or light and surface appearance problems under various molding conditions.

(b) Description of the Related Art

Styrene resins are used for various applications due to their superior mechanical properties, electrical properties, and molding processibility. However, styrene resins are combustible, and their flame resistance and weather resistance are not enough for being used for electrical or automotive components.

Flame retardants and flame retardant synergists are used to provide flame resistance to styrene resins. Typically, a halogen flame retardant and antimony trioxide flame retardant synergist are used. However, when a halogen flame retardant is used to obtain a flame resistant resin, hydrogen halide is generated from the halogen flame retardant by heat or light and causes formation of a carbonyl group or a conjugated double bond, crosslinkage, and breaking of molecular bonds, which are known as the cause of discoloration and deterioration of styrene resins. Therefore, stabilizers like a light stabilizer, a UV stabilizer, and an anti-oxidant are added to solve this problem.

Korea Patent Application No. 1998-044225 discloses use of halogen compounds other than decabromodiphenyl ether and titanium dioxide to improve the heat stability and weather resistance of rubber-modified resins. However, because some flame retardants are limited in improving heat stability and weather resistance, this method cannot be applied for office furnishings. Additionally, as the shape of molding products becomes very complex, surface appearance problems, such as gas silver and black streaks are easily generated during injection molding due to decomposition gas. Therefore, superior heat stability is required to prevent surface appearance problems under various molding conditions.

Accordingly, there is a need for a rubber-modified flame resistant styrene resin that has superior heat stability and weather resistance to prevent discoloration or deterioration due to heat or light, and can be used for various applications.

SUMMARY OF THE INVENTION

The present invention provides a rubber-modified flame resistant styrene resin composition that has superior heat stability and weather resistance to prevent discoloration or deterioration due to heat or light and surface appearance problems under various molding conditions so that it can be used for wide applications.

According to one aspect of the present invention, a rubber-modified flame resistant styrene resin composition comprises: a) 100 parts by weight of a rubber-modified styrene resin; b) 0.2 to 20 parts by weight of a flame retardant: and c) 0.1 to 3 parts by weight of calcium stearate as a lubricant. The flame retardant comprises i) 0.1 to 10 parts by weight of compounds selected from a group consisting of tetrabromobisphenol-A-bis(2,3-dibromopropylether), hexabromocyclododecane and a mixture thereof; and ii) 0.1 to 10 parts by weight of a brominated epoxy oligomer.

According to another aspect of the present invention, a method for preparing a frame retardant styrene resin composition, comprises copolymerizing a rubber phase polymer and a vinyl aromatic monomer to prepare a rubber-modified styrene resin; adding a flame retardant to 100 parts by weight of the rubber-modified styrene resin, the flame retardant including: 0.1 to 10 parts by weight of compound selected from a group consisting of tetrabromobisphenol-A-bis(2,3-dibromopropylether), hexabromocyclododecane and a mixture thereof; and 0.1 to 10 parts by weight of a brominated epoxy oligomer; and adding a lubricant including 0.1 to 3 parts by weight of calcium stearate to 100 parts by weight of the rubber-modified styrene resin.

DETAILED DESCRIPTION OF PREFERRED EMBODIMENTS

Hereinafter, the present invention is explained in more detail.

According to exemplary embodiments of the present invention, when a halogen flame retardant comprising a compound selected from a group consisting of tetrabromobisphenol-A-bis(2,3-dibromopropylether), hexabromocyclododecane and a mixture thereof, and a brominated epoxy oligomer, and a lubricant comprising calcium stearate are added in a rubber-modified styrene resin, the heat stability and weather resistance of a rubber-modified flame resistant styrene composition are improved significantly.

The rubber-modified flame resistant styrene composition of the present invention comprises 100 parts by weight of the rubber-modified styrene resin, 0.2 to 20 parts by weight of the flame retardant and 0.1 to 3 parts by weight of calcium stearate lubricant. The 0.2 to 20 parts by weight of flame retardant comprises 0.1 to 10 parts by weight of a compound selected from a group consisting of tetrabromobisphenol-A-bis(2,3-dibromopropylether), hexabromocyclododecane and a mixture thereof, and 0.1 to 10 parts by weight of brominated epoxy oligomer.

The rubber-modified styrene resin used in the present invention has a rubber phase polymer of which particles are dispersed in a matrix and vinyl aromatic monomers.

As the vinyl aromatic monomer, styrene compounds are predominantly used, and a copolymer of styrene compound and compound that can be copolymerized therewith can also be used. For the styrene compound, styrene; a nucleus-alkyl-substituted styrene such as p-methylstyrene, 2,4-dimethylstyrene, or ethylstyrene; or an α-alkyl-substituted styrene such as α-methylstyrene or α-methyl-p-methylstyrene can be used alone or in combination. As the compound copolymerizable with the styrene compound, a methacrylate ester such as methyl methacrylate or ethyl methacrylate, unsaturated nitrile compound such as acrylonitrile or methacrylonitrile, or maleic anhydride, etc. can be used.

For the rubber phase polymer, a rubber phase polymer comprising polybutadiene, an acrylate or methacrylate, a styrene-butadiene-styrene copolymer, a styrene-butadiene copolymer, polyisoprene, a butadiene-isoprene copolymer, or a natural rubber, etc. can be used. Particularly, polybutadiene or a styrene-butadiene copolymer is preferable, and polybutadiene is more preferable. As the polybutadiene, a low-cis polybutadiene, a high-cis polybutadiene, or a mixture thereof can be used.

Preferably, the rubber phase polymer is contained in an amount of 3 to 30 parts by weight, more preferably 4 to 15 parts by weight, based on 100 parts by weight of a rubber-modified styrene resin. If the content of the rubber phase polymer is less than 3 parts by weight, the impact resistance becomes insufficient, and, if it is over 30 parts by weight, the heat stability may decrease, or a decrease in melt fluidity, gel formation, and discoloration may be caused. Preferably, an average particle diameter of the rubber phase particles is 0.5 to 6 μm, and the glass transition temperature ($T_g$) of the rubber phase polymer is −10° C. or less. If the glass transition temperature is over −10° C., the impact resistance may decrease.

The rubber-modified styrene resin can be polymerized by bulk polymerization, suspension polymerization, or emulsion polymerization. Particularly, bulk polymerization is the most prevalent. In bulk polymerization, after dissolving the rubber phase polymer in the vinyl aromatic monomer, polymerization is conducted by adding a polymerization initiator with stirring.

Tetrabromobisphenol-A-bis(2,3-dibromopropylether) and hexabromocyclododecane, flame retardants used in the present invention, are represented by the following Chemical Formula 1 and Chemical Formula 2, respectively. They offer flame resistance to the rubber-modified styrene resin.

[Chemical Formula 1]

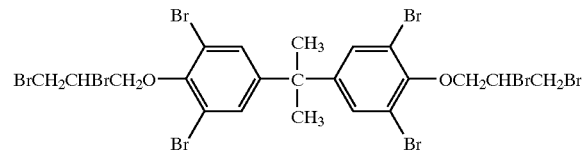

[Chemical Formula 2]

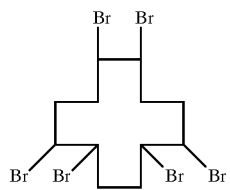

Tetrabromobisphenol-A-bis(2,3-dibromopropylether) and hexabromocyclododecane may be used in the rubber-modified flame resistant styrene resin composition alone or in combination.

The compounds selected from a group consisting of tetrabromobisphenol-A-bis(2,3-dibromopropylether), hexabromocyclododecane and a mixture thereof are preferably contained in an amount of 0.1 to 10 parts by weight, more preferably 1 to 8 parts by weight, based on 100 parts by weight of the rubber-modified styrene resin. If the content is less than 0.1 parts by weight, flame resistance becomes insufficient, and, if it exceeds 10 parts by weight, mechanical strength and heat stability may be poor.

The brominated epoxy oligomer, another flame retardant used in the present invention, is represented by the following Chemical Formula 3. It offers flame resistance and heat stability to the rubber-modified flame resistant styrene resin.

[Chemical Formula 3]

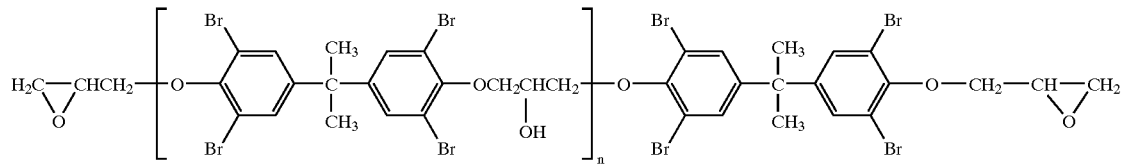

In Chemical Formula 3, n is an integer of 0 to 10.

The brominated epoxy oligomer is preferably contained in an amount of 0.1 to 10 parts by weight, more preferably 0.5 to 8 parts by weight, based on 100 parts by weight of the rubber-modified styrene resin. If the content is less than 0.1 parts by weight, flame resistance and heat stability become poor, and, if it exceeds 10 parts by weight, mechanical strength may decrease.

Calcium stearate, a lubricant used in the present invention, is represented by the following Chemical Formula 4:

[Chemical Formula 4]

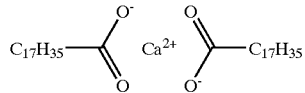

Preferably, the calcium stearate is contained in an amount of 0.1 to 3 parts by weight, based on 100 parts by weight of rubber-modified styrene resin. If the content is less than 0.1 parts by weight, the heat stability may not be insignificantly improved, and, if it exceeds 3 parts by weight, mechanical strength may be significantly reduced.

The rubber-modified flame resistant styrene resin composition of the present invention may further comprise compounds selected from a group consisting of antimony trioxide, antimony pentoxide and a mixture thereof as a flame retardant synergist. The flame retardant synergist causes synergy with halogen compounds used as flame retardants to further improve flame resistance.

Preferably, the flame retardant synergist is contained in an amount of 0.01 to 15 parts by weight, based on 100 parts by weight of the rubber-modified styrene resin. If the content is less than 0.01 parts by weight, synergy with the halogen compound may be insignificant, and, if it exceeds 15 parts by weight, mechanical strength may be significantly reduced.

In addition, the rubber-modified flame resistant styrene resin composition of the present invention may further comprise other additives such as a UV stabilizer and titanium dioxide, in order to improve weather resistance.

For the UV stabilizer, 2-(2-hydroxy-5-methylphenyl) benzotriazole, 2-(3,5-di-t-butyl-2-hydroxyphenyl)-5-chlorobenzotriazole or bis(2,2,6,6-tetramethyl-4- piperidinyl)sebacate, etc. can be used alone or in combination. The UV stabilizer can be preferably used in an amount of 0.05 to 1 part by weight, based on 100 parts by weight of the rubber-modified styrene resin. If its content is less than 0.05 parts by weight, improvement in weather resistance cannot be expected, and, if it exceeds 1 part by weight, the weather resistance improvement effect will not be substantial considering the added amount.

Titanium dioxide suppresses discoloration of the resin. It can be used in an amount of 0.1 to 6 parts by weight, based on 100 parts by weight of the rubber-modified styrene resin. If its content is less than 0.1 parts by weight, the effect of suppressing discoloration of the resin may be insignificant, and, if it exceeds 6 parts by weight, mechanical prosperities may decrease.

The rubber-modified flame resistant styrene resin composition of the present invention shows no discoloration or deterioration due to heat or light, and has superior heat stability and weather resistance. In addition, it can be processed under various molding conditions without surface appearance problems. Particularly, it can be used for light colored office furnishings.

Hereinafter, the present invention is described in more detail through Examples and Comparative Examples. However, the following Examples are only for the understanding of the present invention, and the present invention is not limited by the following Examples.

EXAMPLE

Example 1

(Preparation of a Rubber-Modified Styrene Resin)

A monomer solution comprising 8 parts by weight of butadiene rubber, 77 parts by weight of styrene, and 15 parts by weight of ethylbenzene was prepared. 0.02 parts by weight of 1,1-bis(t-butyl peroxy)-3,3,5-trimethylcyclohexane was added to the monomer solution as a polymerization initiator. The mixture solution was fed into a continuous polymerization system equipped with four agitated reactors linked in series to conduct continuous graft copolymerization. Temperature of the polymerization system was 125° C. at the inlet and 140° C. at the exit. The copolymerization mixture solution was transferred to an evaporation tank to remove unreacted monomer and solvent under the condition of 230° C. and 20 torr. The product was pelletized to obtain a rubber-modified styrene resin (HIPS) comprising 8 wt % of rubber.

(Preparation of a Rubber-Modified Flame Resistant Styrene Resin)

For 100 parts by weight of the above-prepared rubber-modified styrene resin (HIPS) comprising 8 wt % of rubber, 4 parts by weight of tetrabromobisphenol-A-bis(2,3-dibromopropylether) and 2 parts by weight of brominated epoxy oligomer as a flame retardant, 1.5 parts by weight of antimony trioxide as flame retardant synergist, 0.5 parts by weight of calcium stearate as a lubricant, 0.1 parts by weight of an anti-oxidant, 3 parts by weight of titanium dioxide, and 0.5 part by weight of a UV stabilizer were added. The mixture was uniformly mixed using a Henschel mixer. Then, it was extruded and pelletized using a twin screw extruder, and then injection-molded into a specimen.

Examples 2 to 3 and Comparative Examples 1 to 5

The procedure of Example 1 was conducted with different compositions and contents given in the following Table 1 to prepare rubber-modified flame resistant styrene resins of the Examples 2 to 3 and Comparative Examples 1 to 5.

TABLE 1

| Classification | Examples | | | Comparative Examples | | | | |
|---|---|---|---|---|---|---|---|---|
| | 1 | 2 | 3 | 1 | 2 | 3 | 4 | 5 |
| Rubber-modified styrene resin (HIPS) | 100 | 100 | 100 | 100 | 100 | 100 | 100 | 100 |
| Tetrabromo-bisphenol-A-bis(2,3-dibromo-propylether) | 4 | — | 2 | 6 | — | 4 | — | 2 |
| Hexabromo-cyclododecane | — | 4 | 2 | — | 6 | — | 4 | 2 |
| Brominated epoxy oligomer | 2 | 2 | 2 | — | — | 2 | 2 | 2 |
| Antimony trioxide | 1.5 | 1.5 | 1.5 | 1.5 | 1.5 | 1.5 | 1.5 | 1.5 |
| Calcium stearate | 0.5 | 0.5 | 0.5 | 0.5 | 0.5 | — | — | — |
| Zinc stearate | — | — | — | — | — | 0.5 | 0.5 | 0.5 |
| Titanium dioxide | 3 | 3 | 3 | 3 | 3 | 3 | 3 | 3 |
| UV stabilizer | 0.5 | 0.5 | 0.5 | 0.5 | 0.5 | 0.5 | 0.5 | 0.5 |

For the rubber-modified flame resistant styrene resins prepared in Examples 1 to 3 and Comparative Examples 1 to 5, the heat stability, weather resistance, and flame resistance were measured as follows. The results are shown in Table 4.

a) Heat stability—The resins prepared in Examples 1 to 3 and Comparative Examples 1 to 5 were put in a Melt Indexer cylinder at 250° C. for 30 minutes, and then these resins were put in a beaker filled with distilled water. The whiteness of the resins was evaluated with the naked eye according to the standard given in Table 2.

TABLE 2

| ⊚ | Excellent |
|---|---|
| ○ | Superior |
| Δ | Moderate | b) Weather resistance—Weather resistance was measured by ASTM D4459 under the condition of Table 3:

TABLE 3

| Strength | 0.3 W/m$^2$ |
|---|---|
| Light source | Xenon arc |
| Temperature | 55 ± 2° C. |
| Relative humidity | 55 ± 5% |
| Duration | 300 hours | c) Flame resistance—Flame resistance was measured by ASTM D3801 according to UL-94.

TABLE 4

| Classification | Examples | | | Comparative Examples | | | | |
| --- | --- | --- | --- | --- | --- | --- | --- | --- |
| | 1 | 2 | 3 | 1 | 2 | 3 | 4 | 5 |
| Heat stability | ⊚ | ⊚ | ⊚ | Δ | Δ | ○ | ○ | ○ |
| Weather resistance (ΔE) | 2.2 | 2.4 | 2.4 | 3.2 | 3.3 | 2.8 | 3.0 | 2.9 |
| Flame resistance | V-2 | V-2 | V-2 | V-2 | V-2 | V-2 | V-2 | V-2 |

As shown in Table 4, it can be identified that the rubber-modified flame resistant styrene resins of Examples 1 to 3 (which were prepared using tetrabromobisphenol-A-bis(2,3-dibromopropylether), hexabromocyclododecane, and a brominated epoxy oligomer as a flame retardant and using calcium stearate as a lubricant according to the present invention) showed superior heat stability, weather resistance, and flame resistance, compared to those of Comparative Examples 1 to 5. In addition, the resins of Comparative Examples 1 and 2, wherein brominated epoxy oligomer flame retardant was not used, showed very poor heat stability and weather resistance, and the resins of Comparative Examples 3 to 5 using zinc stearate as a lubricant instead of calcium stearate showed very poor weather resistance.

The rubber-modified flame resistant styrene resin composition of the present invention shows no discoloration or deterioration due to heat or light, and has superior heat stability and weather resistance. Also, it can be processed under various molding conditions without surface appearance problems. Therefore, it can be used for light colored office furnishings.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A rubber-modified flame resistant styrene resin composition comprising:
    a) 100 parts by weight of a rubber-modified styrene resin;
    b) 0.2 to 20 parts by weight of a flame retardant comprising:
        i) 0.1 to 10 parts by weight of compound selected from a group consisting of tetrabromobisphenol-A-bis(2,3-dibromopropylether), hexabromocyclododecane and a mixture thereof; and
        ii) 0.1 to 10 parts by weight of a brominated epoxy oligomer; and
    c) 0.1 to 3 parts by weight of calcium stearate as a lubricant.
2. The rubber-modified flame resistant styrene resin composition according to claim 1, wherein the rubber-modified styrene resin of a) is prepared by copolymerization of a rubber phase polymer and a vinyl aromatic monomer.
3. The rubber-modified flame resistant styrene resin composition according to claim 2, wherein the rubber phase polymer has an average particle diameter of 0.5 to 6 μm and a glass transition temperature ($T_g$) of −10° C. or lower.
4. The rubber-modified flame resistant styrene resin composition according to claim 1, wherein the brominated epoxy oligomer of b) ii) is represented by the following Chemical Formula 3:

[Chemical Formula 3]

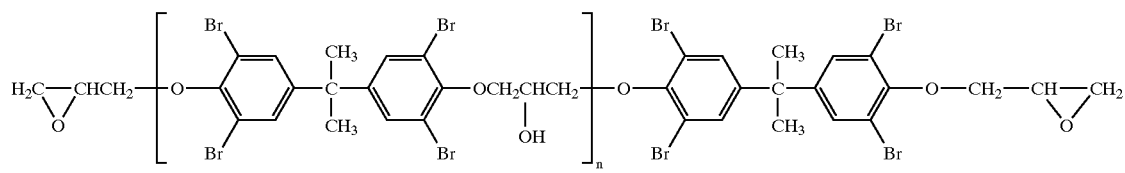

wherein n is an integer of 0 to 10.
5. The rubber-modified flame resistant styrene resin composition according to claim 1, further comprising d) 0.01 to 15 parts by weight of compound selected from a group consisting of antimony trioxide, antimony pentoxide and a mixture thereof, as flame retardant synergist.
6. The rubber-modified flame resistant styrene resin composition according to claim 1, further comprising e) 0.05 to 1 parts by weight of UV stabilizer selected from a group consisting of 2-(2-hydroxy-5-methylphenyl)benzotriazole, 2-(3,5-di-t-butyl-2-hydroxyphenyl)-5-chlorobenzotriazole, bis(2,2,6,6-tetramethyl-4-piperidinyl)sebacate and a mixture thereof.
7. The rubber-modified flame resistant styrene resin composition according to claim 1, further comprising f) 0.1 to 6 parts by weight of titanium dioxide.
8. A method for preparing a frame retardant styrene resin composition, comprising:
    copolymerizing a rubber phase polymer and a vinyl aromatic monomer to prepare a rubber-modified styrene resin;
    adding a flame retardant to 100 parts by weight of the rubber-modified styrene resin, the flame retardant including:
        0.1 to 10 parts by weight of compound selected from a group consisting of tetrabromobisphenol-A-bis(2,3-dibromopropylether), hexabromocyclododecane and a mixture thereof; and
        0.1 to 10 parts by weight of a brominated epoxy oligomer; and
    adding a lubricant including 0.1 to 3 parts by weight of calcium stearate to 100 parts by weight of the rubber-modified styrene resin.
9. The method according to claim 8, further comprising:
    adding a flame retardant synergist including 0.01 to 15 parts by weight of compound selected from a group consisting of antimony trioxide, antimony pentoxide and a mixture thereof, to 100 parts by weight of the rubber-modified styrene resin.
10. The method according to claim 8, further comprising:
    adding 0.05 to 1 parts by weight of UV stabilizer selected from a group consisting of 2-(2-hydroxy-5-methylphenyl)benzotriazole, 2-(3,5-di-t-butyl-2- hydroxyphenyl)-5-chlorobenzotriazole, bis(2,2,6,6-tetramethyl-4-piperidinyl)sebacate and a mixture thereof, to 100 parts by weight of the rubber-modified styrene resin.

11. The method according to claim 8, further comprising: adding 0.1 to 6 parts by weight of titanium dioxide to 100 parts by weight of the rubber-modified styrene resin.

12. The method according to claim 8, wherein copolymerizing a rubber phase polymer and a vinyl aromatic monomer is performed by bulk polymerization, suspension polymerization, or emulsion polymerization.

13. The method according to claim 8, wherein copolymerizing a rubber phase polymer and a vinyl aromatic monomer includes adding the rubber phase polymer in an amount of 3 to 30 parts by weight, based on 100 parts by weight of the rubber-modified styrene resin.

* * * * *